Patented Feb. 15, 1938

2,108,715

UNITED STATES PATENT OFFICE 2,108,715

PROCESS OF COATING WORKED SOLID MATERIALS

Albert Koch, Cologne-Deutz, Germany, assignor to I. G. Farbenindustrie Aktiengesellschaft, Frankfort-on-the-Main, Germany No Drawing. Application April 9, 1934, Serial No. 719,807. In Germany April 13, 1933

4 Claims. (Cl. 91—68)

The present invention relates to an improvement in or a modification of the process of coating worked solid materials, such as tubes or vessels, with vulcanizable mixtures of soft or hard rubber and effecting vulcanization of the said mixture while being in contact with the worked solid materials.

It has been proposed to coat worked solid materials, such as tubes or vessels, with vulcanizable mixtures of soft and hard rubber and to effect vulcanization of the said mixture in order to protect the worked materials against the attack of acids or other chemically active materials. The vulcanization of the vulcanizable mixtures has hitherto been effected by means of hot water or hot aqueous solutions of inorganic salts, such as sodium chloride. As a matter of fact vulcanizable mixtures in order to be suitable for this method of working must contain besides the usual auxiliary agents and filling materials strongly acting vulcanization accelerators so that a complete vulcanization of the mixtures can be effected in spite of the relatively low vulcanization temperatures.

This method of working is accompanied by several disadvantages, chief among which is the fact that during the vulcanization process part of the accelerators or other ingredients of the vulcanization mixture is dissolved or decomposed due to the long-continued contact with the hot water or the hot aqueous solution of salts. Thereby the drawback is involved that the upper layer of the coated materials is not completely vulcanized, particularly if mixtures of hard rubber are employed. These insufficiently vulcanized coatings are easily attacked and destroyed by chemically active materials.

I have now found that the disadvantages inherent to the hitherto applied method of working can be completely overcome by applying a strongly adherent water impermeable layer of film forming materials onto the rubber mixture prior to vulcanization. It is, therefore, the object of my present invention to provide worked solid materials, such as tubes or vessels, particularly such materials as are not transportable, with coatings consisting of vulcanizable rubber mixtures and having applied thereon a strongly adherent water impermeable layer of a suitable film-forming material, these coatings being not subject to the danger of being insufficiently vulcanized. Therefore, the worked materials provided with coatings of vulcanized rubber in accordance with the present invention are far better protected against the attack of chemically active substances than it has been heretofore possible. As water impermeable film-forming materials there can be used, for instance, lacquers prepared from natural or synthetic resins, such as shellac, copal, polystyrene, polyvinylchloride, condensation products from polybasic acids and polyhydric alcohols, condensation products from phenolic bodies and/or urea with aldehydes, furthermore, elastic oil lacquers, lacquers of chlorinated caoutchouc, cellulose ethers, isomerized caoutchouc and so on, if desired, in the presence of suitable softening agents, filling materials, pigments etc. The film-forming material can be applied on the surface of the vulcanizable rubber mixture in any desired manner, for instance by brushing or spraying the same in form of solutions in organic solvents or suspensions in organic solvents or in water, and causing the layer to dry.

Coatings of vulcanizable rubber mixtures, which have been applied to worked solid materials and have been provided with a protective coating as described above, can be vulcanized by means of hot water or hot solutions of salt without involving the danger of dissolving or decomposing the vulcanization accelerators or other ingredients contained in the vulcanizable mixture. After the vulcanization is finished, the film-forming materials can be left on the caoutchouc layer or they may be removed, for instance, by means of suitable solvents or by mechanical means. If strongly resistant film-forming agents are employed it is preferable not to remove the same, since they themselves show a remarkable protective effect for the rubber coatings.

The following examples illustrate the invention, without, however, restricting it thereto, the parts being by weight:—

*Example 1*

An iron container, which cannot be transported, is coated with a double sheet of 4 mm. thickness of a hard rubber mixture prepared on the calender. The hard rubber mixture consists of the following ingredients:—

| | Parts |
|---|---|
| Smoked sheets | 100 |
| Ground hard rubber | 50 |
| Kaoline | 50 |
| Zinc oxide | 25 |
| Magnesium oxide | 10 |
| Sulfur | 42 |
| Tetramethyl thiuram disulfide | 5 |

The surface of the mixture of unvulcanized hard rubber being thus applied on the iron container, is painted several times with a solution of chlorinated caoutchouc of the following composition:—

| | Parts |
|---|---|
| Chlorinated caoutchouc | 24 |
| Organic sulfur-containing compounds, obtainable in a known manner by reacting with sulfur upon homologues of benzene, such as toluene or xylene in the presence of a small amount of aluminium chloride (see U. S. Patents 1,426,430 and 1,427,182) | 4-6 |
| Iron oxide red, or titanium dioxide | 8-12 |
| Toluene | 20 |
| Xylene | 38 |

After the solvent has been completely evaporated the vessel is filled with water and the water is kept boiling for about 48 hours by introducing steam.

Example 2

A container is coated with a layer of vulcanizable rubber by spraying thereon several times a mixture of:—

| | Parts |
|---|---|
| Concentrated rubber latex of 60% strength | 160 |
| Colloidal sulfur containing 15% of water | 48 |
| Zinc oxide | 30 |
| Tetramethyl thiuram disulfide | 5 |
| Ammoniacal solution of caseine | 20 |

After the water has been evaporated the rubber surface is sprayed several times with a solution of chlorinated caoutchouc of the following composition:—

| | Parts |
|---|---|
| Chlorinated caoutchouc | 24 |
| Chlorinated diphenyl having a chlorine content of about 55% | 3-6 |
| Xylene | 38 |
| Toluene | 20 |

After the solvents have been evaporated the container is filled with an aqueous solution of sodium chloride of 10% strength and the solution is heated to boiling by means of a steam coil. The vulcanization is completed after about 24 hours.

Example 3

A wooden container is coated with a double sheet of soft rubber of 4 mm. thickness, which has been prepared on the calender. The soft rubber mixture has the following composition:—

| | Parts |
|---|---|
| Smoked sheets | 100 |
| Zinc oxide | 5 |
| Sulfur | 1.7 |
| Heavy spar | 40 |
| Inactive soot | 5 |
| Aldol-alpha-naphthylamine | 1.5 |
| Ozokerite | 1.2 |
| Piperidyl-dithiocarbamic acid piperidine | 0.5 |
| Benzothiazyl-disulfide | 0.1 |

The surface of the soft rubber layer is coated several times with a solution of chlorinated caoutchouc, having the following composition:—

| | Parts |
|---|---|
| Chlorinated caoutchouc | 24 |
| Chlorinated diphenyl, having a chlorine content of about 55% | 5 |
| Xylene | 50 |
| Toluene | 20 |

After the solvent has been evaporated the container is filled with water and the vulcanization is effected as described in the foregoing examples.

Example 4

An iron container, which cannot be transported, is coated with a double sheet of 4 mm. thickness of a hard rubber mixture prepared on the calender. The hard rubber mixture consists of the following ingredients:—

| | Parts |
|---|---|
| Smoked sheets | 100 |
| Ground hard rubber | 50 |
| Kaoline | 50 |
| Zinc oxide | 25 |
| Magnesium oxide | 10 |
| Sulfur | 42 |
| Tetramethyl thiuram disulfide | 5 |

The surface of the mixture of unvulcanized hard rubber being thus applied onto the iron container is painted twice in an interval of about 8 hours with a solution of:—

| | Parts |
|---|---|
| Benzyl cellulose | 8 |
| Benzene | 30 |
| Toluene | 20 |
| Xylene | 25 |
| Butylacetate | 10 |
| Butylalcohol | 4 |
| Ethylalcohol | 3 |

Titanium dioxide may be added as pigment.— The solvent is evaporated and vulcanization is effected as described in Example 1.

Example 5

A container is coated with a layer of vulcanizable rubber by spraying thereon several times a mixture of:—

| | Parts |
|---|---|
| Concentrated rubber latex of 60% strength | 160 |
| Colloidal sulfur containing 15% of water | 48 |
| Zinc oxide | 30 |
| Tetramethyl thiuram disulfide | 5 |
| Ammoniacal solution of caseine | 20 |

After the water has been evaporated the rubber surface is brushed with a solution of:—

| | Parts |
|---|---|
| Resin obtainable according to the process described in Example 2 of U. S. Patent No. 1,863,881 | 20 |
| Standoil | 60 |
| Turpentine oil and the necessary amount of a dryer | 20 |
| and, if desired, | |
| Iron oxide red | 40-50 |

The solvent is evaporated and vulcanization is effected as described in Example 2.

Example 6

A wooden container is coated with a double sheet of soft rubber of 4 mm. thickness, which has been prepared on the calender. The soft rubber mixture has the following composition:—

| | Parts |
|---|---|
| Smoked sheets | 100 |
| Zinc oxide | 5 |
| Sulfur | 1.7 |
| Heavy spar | 40 |
| Inactive soot | 5 |
| Aldol-alpha-naphthylamine | 1.5 |
| Ozokerite | 1.2 |
| Piperidyl-dithiocarbamic acid piperidine | 0.5 |
| Benzothiazyl-disulfide | 0.1 |

The surface of the soft rubber layer thus prepared is coated twice in an interval of about 10 hours with a mixture containing:—

| | Parts |
|---|---|
| Isomerized caoutchouc | 9–10 |
| Xylene | 91–90 |
| and, if desired, | |
| Carbon black | 3–4 |

The solvent is evaporated and vulcanization is effected as described in the foregoing examples.

I claim—

1. The coating of the inner surface of hollows, such as tubes or vessels, with a layer of vulcanized rubber by first applying thereon a vulcanizable rubber mixture, providing the surface thereof with a layer of a strongly adherent water-impermeable film-forming material capable of preventing dissolution and decomposition of ingredients in the interposed rubber coating when being in contact with hot water, and effecting vulcanization of the interposed rubber mixture by contacting the layer of the film-forming material with hot water.

2. The process according to claim 1, wherein the film-forming material contains chlorinated caoutchouc.

3. The process according to claim 1, wherein the film-forming material contains a cellulose ether.

4. A process according to claim 1, wherein the film-forming material contains an oil-lacquer.

ALBERT KOCH.